(12) United States Patent
Boettcher et al.

(10) Patent No.: US 9,815,136 B2
(45) Date of Patent: Nov. 14, 2017

(54) METHOD FOR SINGLE-SIDED RESISTANCE WELDING

(71) Applicant: Honda Motor Co., Ltd., Minato-ku, Tokyo (JP)

(72) Inventors: Eric J. Boettcher, Columbus, OH (US); Robb Louis Augustine, Dublin, OH (US); Anthony D. Prescenzi, Marysville, OH (US); Daniel A. Paolini, Powell, OH (US); Randall A. Wieland, Powell, OH (US); Kevin S. Schnipke, Prospect, OH (US); Michael Monastra, Lewis Center, OH (US); Keith G. Strickland, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 263 days.

(21) Appl. No.: 14/205,509

(22) Filed: Mar. 12, 2014

(65) Prior Publication Data
US 2014/0263197 A1    Sep. 18, 2014

Related U.S. Application Data

(60) Provisional application No. 61/779,190, filed on Mar. 13, 2013.

(51) Int. Cl.
*B23K 11/11*    (2006.01)
*B23K 11/30*    (2006.01)
(Continued)

(52) U.S. Cl.
CPC ............ *B23K 11/11* (2013.01); *B23K 11/115* (2013.01); *B23K 11/16* (2013.01); *B23K 11/30* (2013.01);
(Continued)

(58) Field of Classification Search
CPC ..................................................... B23K 11/11
See application file for complete search history.

(56) References Cited

U.S. PATENT DOCUMENTS 2,137,909 A    11/1938    Hagedorn
2,300,700 A    11/1942    Porter et al.
(Continued)

FOREIGN PATENT DOCUMENTS

CN    101282814 A    10/2008
CN    201900377 U     7/2011
(Continued)

OTHER PUBLICATIONS

China First Office Action for related application 201410192577.7 dated Aug. 31, 2015; 11 pp.
(Continued)

*Primary Examiner* — Tu B Hoang
*Assistant Examiner* — Erin McGrath
(74) *Attorney, Agent, or Firm* — Armstrong Teasdale LLP

(57) ABSTRACT

A method of single-sided resistance welding includes providing a first workpiece and a second workpiece. The first workpiece is positioned so that at least a portion of the first workpiece is in contact with at least a portion of the second workpiece. A weld electrode is positioned in contact with the first workpiece, and a ground electrode is positioned in contact with the second workpiece. A determination is made as to whether a gap or other high resistance condition is present between the first workpiece and the second workpiece. If a gap or other high resistance condition is determined to be present between the first workpiece and the second workpiece, the gap or other high resistance condition is reduced, and the first workpiece and the second workpiece are joined through welding.

12 Claims, 9 Drawing Sheets

(51) Int. Cl.
*B23K 11/16* (2006.01)
*B23K 11/31* (2006.01)
*B23K 101/00* (2006.01)
*B23K 101/18* (2006.01)
*B23K 103/04* (2006.01)

(52) U.S. Cl.
CPC ........ *B23K 11/31* (2013.01); *B23K 2201/006* (2013.01); *B23K 2201/18* (2013.01); *B23K 2203/04* (2013.01)

(56) References Cited

U.S. PATENT DOCUMENTS

| | | |
|---|---|---|
| 2,675,454 A | 4/1954 | Warner |
| 3,231,710 A | 1/1966 | Barnet et al. |
| 3,629,541 A | 12/1971 | Mims et al. |
| 4,427,869 A | 1/1984 | Kimura et al. |
| 4,876,430 A | 10/1989 | Herschitz et al. |
| 5,021,625 A | 6/1991 | Destefan et al. |
| 5,030,814 A | 7/1991 | Tange et al. |
| 5,079,400 A | 1/1992 | Firlotte et al. |
| 6,515,251 B1 | 2/2003 | Wind |
| 6,806,436 B2 | 10/2004 | Katou et al. |
| 7,718,918 B2 | 5/2010 | Spinella et al. |
| 2010/0320192 A1 | 12/2010 | Plha et al. |
| 2011/0272384 A1* | 11/2011 | Matsushita ........... B23K 11/115 219/91.2 |
| 2012/0118861 A1* | 5/2012 | Haeufgloeckner ..... B23K 11/11 219/91.1 |

FOREIGN PATENT DOCUMENTS

| | | |
|---|---|---|
| EP | 0842725 A1 | 5/1998 |
| JP | H0270388 A | 3/1990 |
| JP | H07266059 A | 10/1995 |
| JP | 200296178 A | 4/2002 |
| JP | 2005161391 A | 6/2005 |
| JP | 2007-331012 A | 12/2007 |
| JP | 2007326139 A | 12/2007 |

OTHER PUBLICATIONS

Office Action issued in Japanese Patent Application No. 2014-045955; dated May 26, 2015; 7 pages including English translation.

* cited by examiner

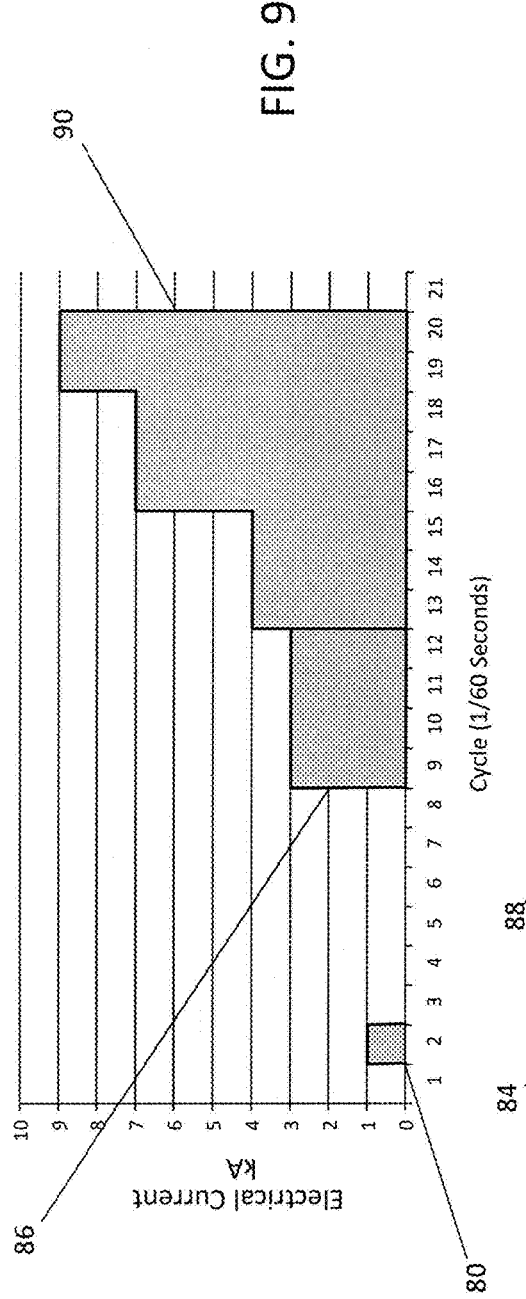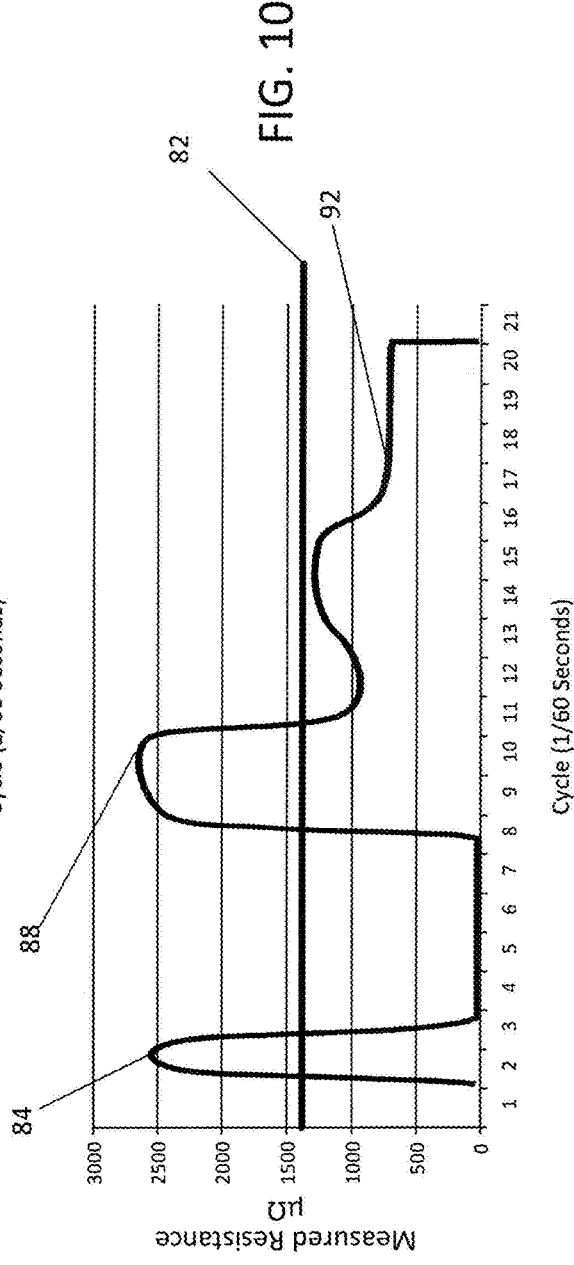

METHOD FOR SINGLE-SIDED RESISTANCE WELDING

REFERENCE TO RELATED APPLICATION

This application claims priority of U.S. provisional patent application Ser. No. 61/779,190, filed Mar. 13, 2013, and hereby incorporates this provisional patent application by reference herein in its entirety.

TECHNICAL FIELD

This application relates generally to resistance welding, and more particularly, to single-sided resistance welding.

BACKGROUND

Resistance welding is a common method of joining together two or more metal workpieces such as sheet metal used to manufacture automobiles and other such vehicles. Typically, two workpieces are placed proximate to each other so that at least a portion of the two workpieces are in contact. One or more electrodes are placed in contact with the workpieces. An electrical current is applied to the workpieces through the electrodes to heat and melt the portions of the workpieces that are in contact such that the workpieces are joined upon the cooling of the melted portion.

Types of resistance welding include two-sided resistance welding and single-sided resistance welding. Two-sided resistance welding typically includes positioning one electrode on a top surface of a first workpiece and positioning a second electrode on the bottom surface of a second workpiece that overlaps the first workpiece. A force is commonly applied by the two electrodes to press the two workpieces together so that the workpieces are in contact during the welding process. An electrical current is applied to the workpieces through the electrodes to weld the workpieces together.

Single-sided resistance welding is commonly utilized when only one surface of the workpieces is accessible to the welding equipment. Single-sided resistance welding typically includes positioning two workpieces so that a portion of the two workpieces overlap. A first electrode is positioned on a top surface of a first workpiece above the overlapping portion of the two workpieces. A second electrode is positioned on the top surface of a second workpiece away from the overlapping portion of the workpieces. An electrical current is applied to the workpieces through the electrodes to weld the workpieces together.

SUMMARY

According to a first embodiment, a method of single-sided resistance welding includes providing a first workpiece and a second workpiece. The first workpiece is positioned so that at least a portion of the first workpiece is in contact with at least a portion of the second workpiece. A weld electrode is positioned in contact with the first workpiece, and a ground electrode is positioned in contact with the second workpiece. A determination is made as to whether a gap is present between the first workpiece and the second workpiece. If a gap is determined to be present between the first workpiece and the second workpiece, the gap is reduced, and the first workpiece and the second workpiece are joined together through welding.

In accordance with a second embodiment, a method of determining a resistance threshold limit for a single-sided welding process includes conducting a test. The test includes providing a first workpiece, providing a second workpiece, and providing a first electrical insulating member with a first thickness. The test further includes positioning the first electrical insulating member in contact with a first surface of the first workpiece and in contact with the second workpiece, positioning a weld electrode in contact with a second surface of first workpiece and proximate to the first electrical insulating member, and positioning a ground electrode in contact with the second workpiece. The test also includes applying a first electrical current to the first workpiece and the second workpiece and measuring a magnitude of a resistance to the first electrical current. The method further includes setting the resistance threshold limit based at least in part on an analysis of the measurement of the magnitude of the resistance to the first electrical current.

According to a third embodiment, a method of single-sided resistance welding includes providing a first workpiece and a second workpiece. The first workpiece is positioned so that at least a portion of the first workpiece is in contact with at least a portion of the second workpiece. A weld electrode is positioned in contact with the first workpiece, and a ground electrode is positioned in contact with the second workpiece. A determination is made as to whether a high resistance condition is present. This determination includes applying a first electrical current to the first workpiece and the second workpiece. The high resistance condition is reduced by selectively applying a second electrical current to the first workpiece and the second workpiece. The first workpiece and the second workpiece are joined together through welding.

According to a fourth embodiment, with respect to the method of the third embodiment, determining if the high resistance condition is present further comprises defining a resistance threshold limit, measuring a magnitude of a resistance to the first electrical current, and comparing the magnitude of the resistance to the first electrical current to the resistance threshold limit.

According to a fifth embodiment, the method of the fourth embodiment further comprises determining whether the magnitude of the resistance to the first electrical current is greater than or less than the resistance threshold limit. The selectively applying of the second electrical current to the first workpiece and the second workpiece occurs if the magnitude of the resistance is greater than the resistance threshold limit.

According to a sixth embodiment, with respect to the method of the fifth embodiment, the second electrical current is at least a portion of a thermal deflection schedule applied to the first workpiece and the second workpiece. The high resistance condition comprises high resistance in at least one of the contact between the weld electrode with the first workpiece and the ground electrode with the second workpiece. The thermal deflection schedule is applied to the first workpiece and the second workpiece to reduce the high resistance condition.

According to a seventh embodiment, with respect to the method of the fifth embodiment, the second electrical current is at least a portion of a thermal deflection schedule applied to the first workpiece and the second workpiece. The high resistance condition comprises a gap present between the first workpiece and the second workpiece. The thermal deflection schedule is applied to the first workpiece and the second workpiece to thermally deflect at least one of the first workpiece and the second workpiece to reduce the gap until the gap is closed.

BRIEF DESCRIPTION OF THE DRAWINGS

Various embodiments will become better understood with regard to the following description, appended claims and accompanying drawings wherein:

FIG. 9 is a chart depicting a sensing schedule, a thermal deformation schedule, and a welding schedule in accordance with one embodiment; and FIG. 10 is a chart depicting resistance measurements captured during the scheduled applied in FIG. 9.

DETAILED DESCRIPTION

The apparatuses and methods disclosed in this document are described in detail by way of examples and with reference to the figures. Unless otherwise specified, like numbers in figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be and should not be construed as mandatory or limiting unless specifically designated as such. Selected examples of apparatuses and methods for single-sided welding are hereinafter disclosed and described in detail with reference made to FIGS. 1-10.

Figure 1:
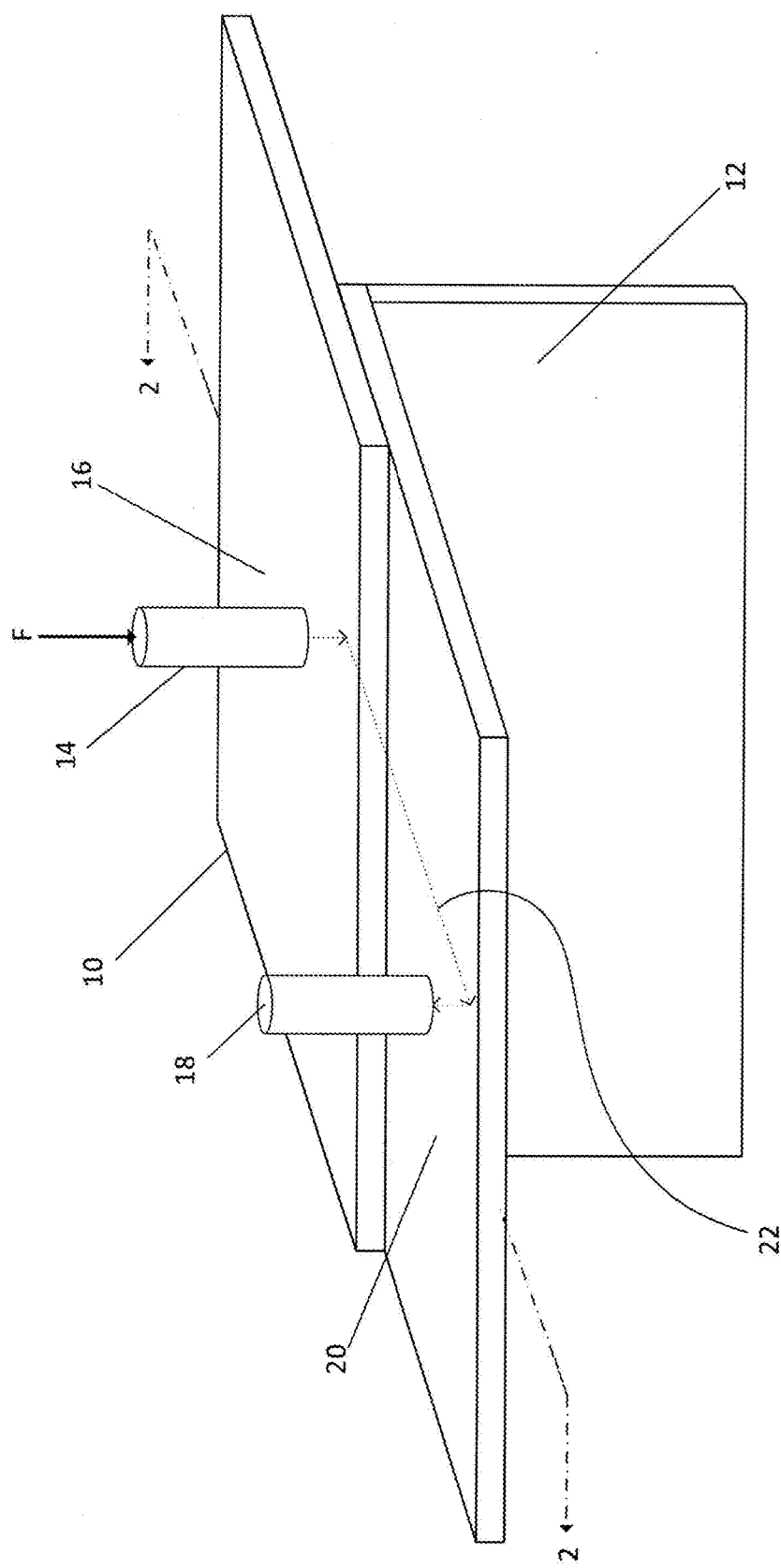
FIG. 1 is a right, front perspective view depicting an arrangement for single-sided welding of two workpieces according to one embodiment.

FIG. 1 illustrates an arrangement for facilitating single-sided resistance welding. A first workpiece 10 can be positioned adjacent to a second workpiece 12 so that at least a portion of the first workpiece 10 overlaps with a portion of the second workpiece 12. The first and second workpieces 10, 12 can be further positioned so that at least a portion of the first and second workpieces 10, 12 are in direct contact. Once in direct contact, the first 10 and second 12 workpieces can be joined along at least a portion of the contact area through a single-sided resistance welding process.

Figure 2:
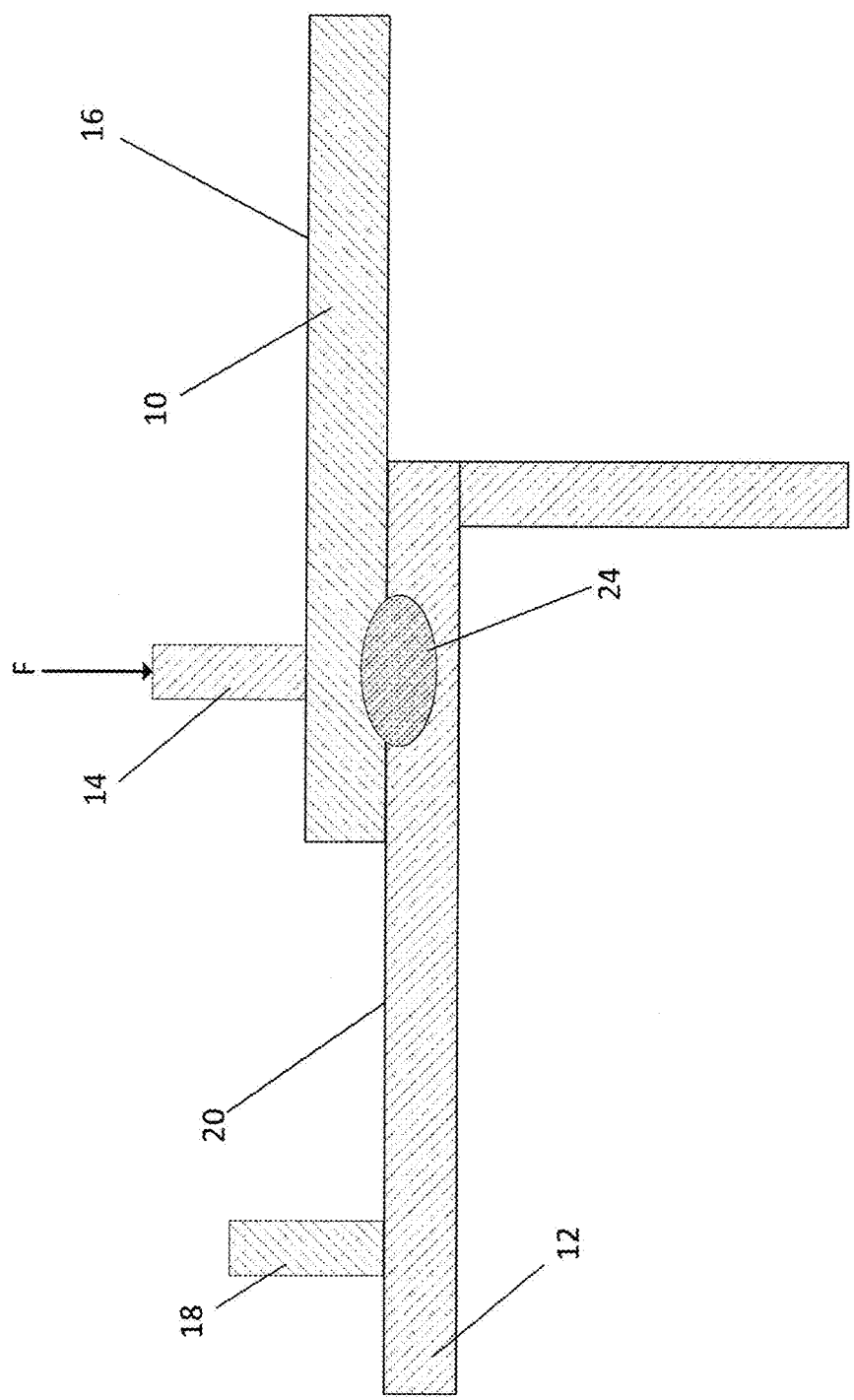
FIG. 2 is a cross-sectional view of the arrangement of FIG. 1 taken along line 2-2.

A first electrode 14 can be positioned in contact with a top surface 16 of the first workpiece 10, and a second electrode 18 can be placed in contact with a top surface 20 of the second workpiece 12. Welding equipment (not shown) can be arranged to pass an electrical current 22 through the first and second electrodes 14, 18 such that the electrical current 22 flows from the first electrode 14, through the first and second workpieces 10, 12, and to the second electrode 18. As the electrical current 22 flows from the first electrode 14 into portions of the first and second workpieces 10, 12 proximate to the first electrode 14, the material's resistance to the electrical current 22 can cause the material proximate to the first electrode 14 to increase in temperature such that the material flows or otherwise melts. As illustrated in FIG. 2, once the melted material cools, a weld nugget 24 can form such that the first and second workpieces 10, 12 are joined together by the welding processes.

Figure 3:
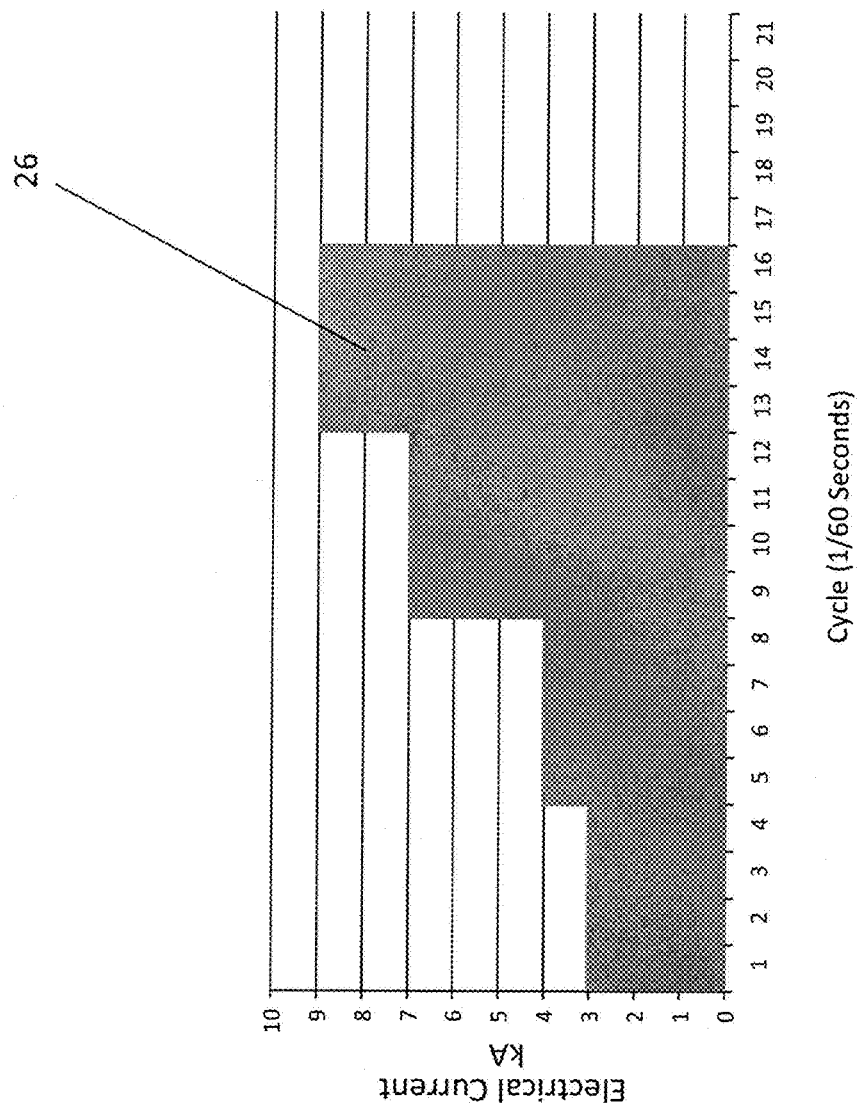
FIG. 3 is a chart depicting a welding schedule according to one embodiment.

The electrical current 22 can be applied in accordance with a welding schedule, where the electrical current 22 is applied at specific amperages for specific periods of time to facilitate the welding of the first and second workpieces 10, 12. A welding schedule 26 in accordance with one embodiment is illustrated in FIG. 3. The welding schedule 26 is graphically plotted on a two-dimensional chart with electrical current represented by the Y-axis and time represented by the X-axis. In this example, the electrical current applied to workpieces ranges from 3 to 9 kilo-amperes (kA), and the total time that electrical current is applied to workpieces is 16 cycles, where one cycle is ⅟₆₀ of a second. Welding schedules can vary depending on the material composition, size, shape, and arrangement of workpieces. It will be understood that each combination of workpieces can result in a welding schedule developed and implemented to weld those workpieces together.

The workpieces 10, 12 as shown throughout the figures and described though this specification are merely examples. It will be understood that the methods and apparatus described herein can include any number and variety of workpieces such as, for example, sheet metal fabricated as panels for vehicles, rails and tubular steel fabricated as frame members for a vehicle, or any other workpieces that are arranged to be joined by a welding process. It will be further understood that the workpieces can be arranged in such a manner that only one side or surface of the workpieces are accessible to the electrodes and other welding equipment. Although the figures and description herein uses the terms "first electrode" and "second electrode," it will also be understood that the first electrode 14 can also be described as a weld electrode, and the second electrode 18 can also be described as a ground electrode. Weld electrodes and ground electrodes can be arranged such that welding equipment applies an electrical current to the weld electrode such that the electrical current flows from the weld electrode, through the workpieces, and to the ground electrode.

As illustrated in FIGS. 1 and 2, areas of the workpieces 10, 12 that are proximate to the first electrode 14 can be in direct contact with each other. In such an arrangement, the electrical current 22 can flow in a direct path through the material of the workpieces 10, 12 between the first and second electrodes 14, 18. However, environmental conditions or the workpieces 10, 12 themselves can cause localized gaps or spaces between contact areas on the workpieces 10, 12 when the workpieces 10, 12 are positioned together. For example, manufacturing processes of workpieces can result in workpieces with surfaces that are not uniformly flat. Such variations in the surfaces of workpieces can cause gaps between workpieces when the workpieces are positioned together. In another example, corrosion and debris on the surface of workpieces can also result in gaps between workpieces positioned together. In addition, touching condition of the electrodes to the workpieces can be less than ideal, resulting in a high resistance condition. Debris or contamination on the electrode surface is an example of a potentially poor touch condition creating an abnormally high resistance. It will be understood that when the first and second workpieces 10, 12 are positioned together during resistance welding processes, there can be numerous gaps or spaces between contact surfaces of the workpieces 10, 12. If the first electrode 14 is positioned above such a gap or space, the flow of electrical current 22 can be inhibited during a resistance welding processes, which can result in an inferior weld or no weld at all. A similar situation can occur if a high resistance is identified at the contact region of one or more electrode(s) to the workpiece(s).

Resistance welding is commonly used to join large workpieces such as sheet metal panels for vehicles. To join such large workpieces, resistance welding can be used to form a series of spot welds, where the workpieces and weld electrodes are moved relative to one another to form the series of spot welds. As will be understood, during such a process, the weld electrode can on occasion be positioned so that the weld electrode is above a gap or space, which can affect the quality of the spot weld formed at that location. In addition, as described in the preceding paragraph, electrode surface cleanliness can also affect spot weld quality.

Figure 4:
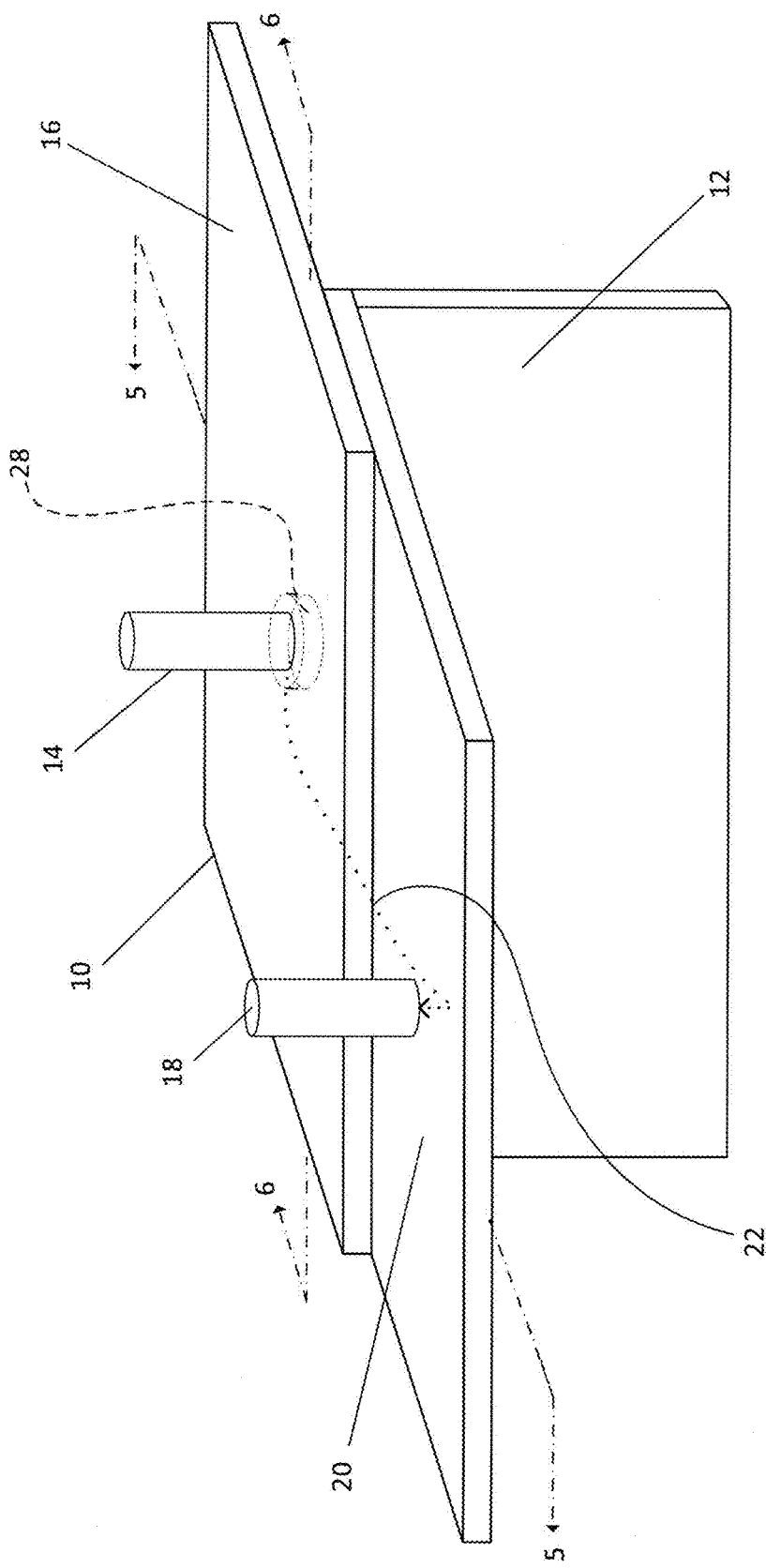
FIG. 4 is a right, front perspective view depicting the workpieces of FIG. 1 with a gap existing between the workpieces.
Figure 5:
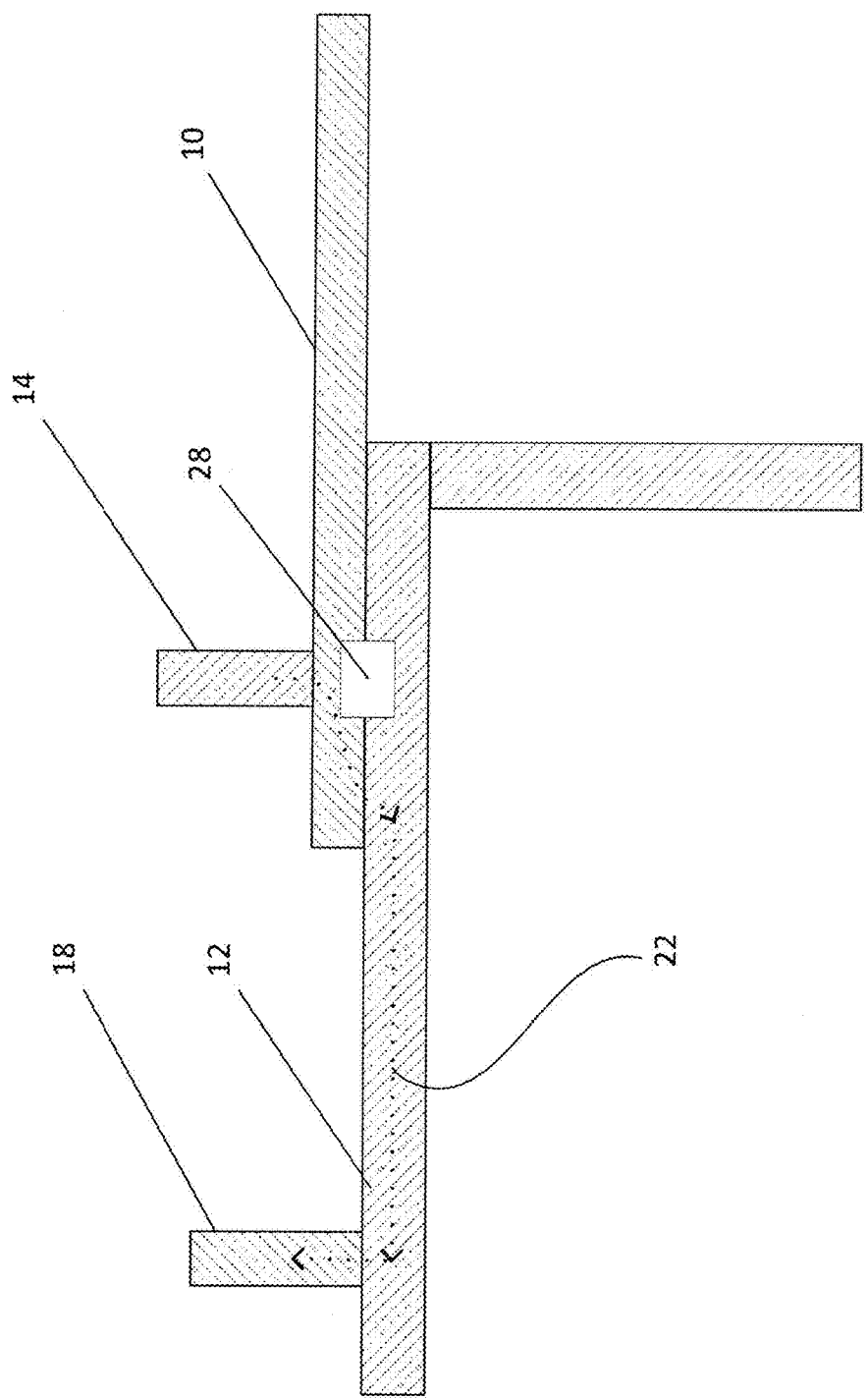
FIG. 5 is a cross-sectional view of the arrangement of FIG. 4 taken along line 5-5.
Figure 6:
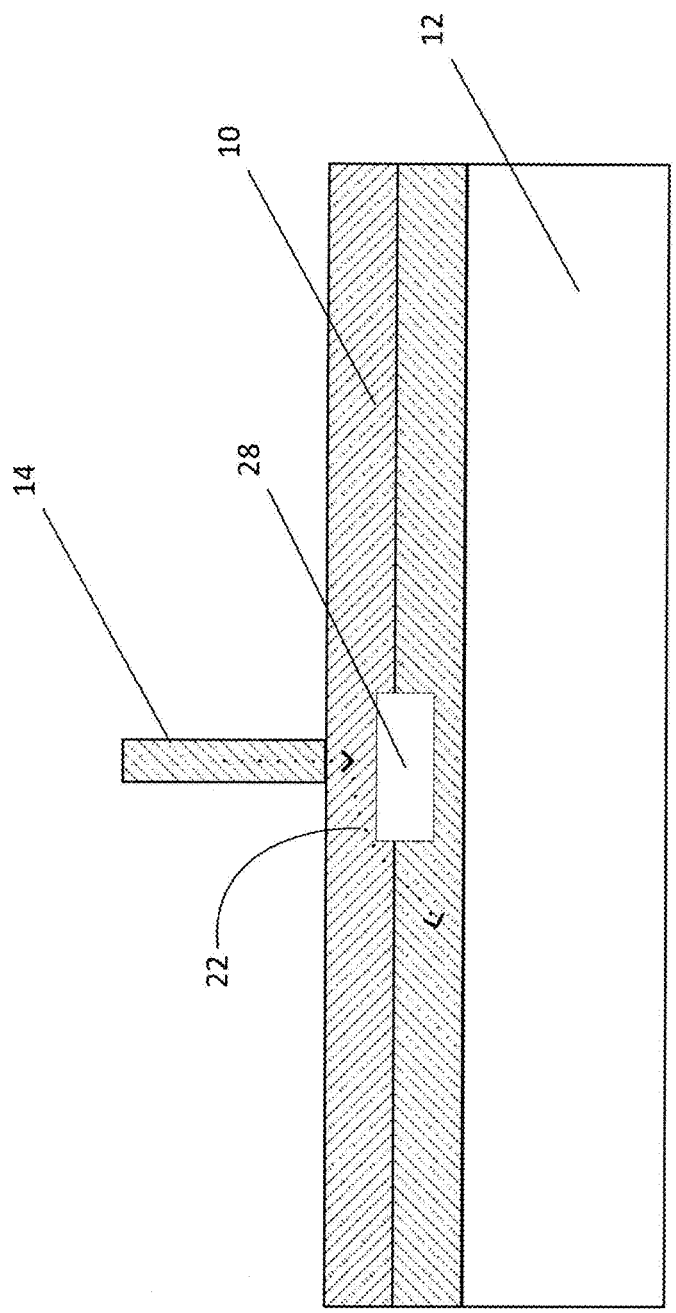
FIG. 6 is a cross-sectional view of the arrangement of FIG. 4 taken along line 6-6.

As illustrated in FIG. 4, the first electrode 14 can be positioned in contact with the first workpiece 10 such that the first electrode 14 is positioned above a gap 28 between the first 10 and second 12 workpieces. FIGS. 5 and 6 illustrate cross-sectional views of FIG. 4. As illustrated in FIG. 2, the resistance welding processes can result in the weld nugget 24 forming below the first electrode 14 to join the workpieces 10, 12. The resistance welding processes can be typically arranged such that the electrical current 22 passes from the first electrode 14 through the first and second workpieces 10, 12 and onto the second electrode 18. In such an arrangement, the heat required for welding can accrue below the first electrode 14 so that the weld nugget 24 welds the workpieces 10, 12 together below the first electrode 14. It will be understood that when a localized gap 28 between the workpieces 10, 12 is positioned below the first electrode 14, the electrical current 22 is likely to find an alternative path from the first electrode 14 to the second electrode 18, as illustrated in FIGS. 4-6. Such an alternative path can alter the anticipated welding conditions (as shown in FIGS. 1 and 2) and can result in a weld nugget being formed, if formed at all, at an unpredictable location and of inconsistent quality.

Methods can be arranged to mitigate the presence of localized gaps or spaces between workpieces that can affect resistance welding. In one example, a method for using resistance welding to join workpieces includes a determination of whether there is a gap or other high resistance condition. A method of determining whether there is such a gap or other high resistance condition can include applying an electrical current with relatively low amperage to the weld electrode and measuring the resistance between the weld electrode and ground electrode. The measured resistance can be compared to a threshold limit, where the threshold limit is selected such that readings above the threshold limit indicate the presence of a gap or other high resistance condition and readings below the threshold limit indicates that no substantial gap or other high resistance condition is present.

Figure 7:
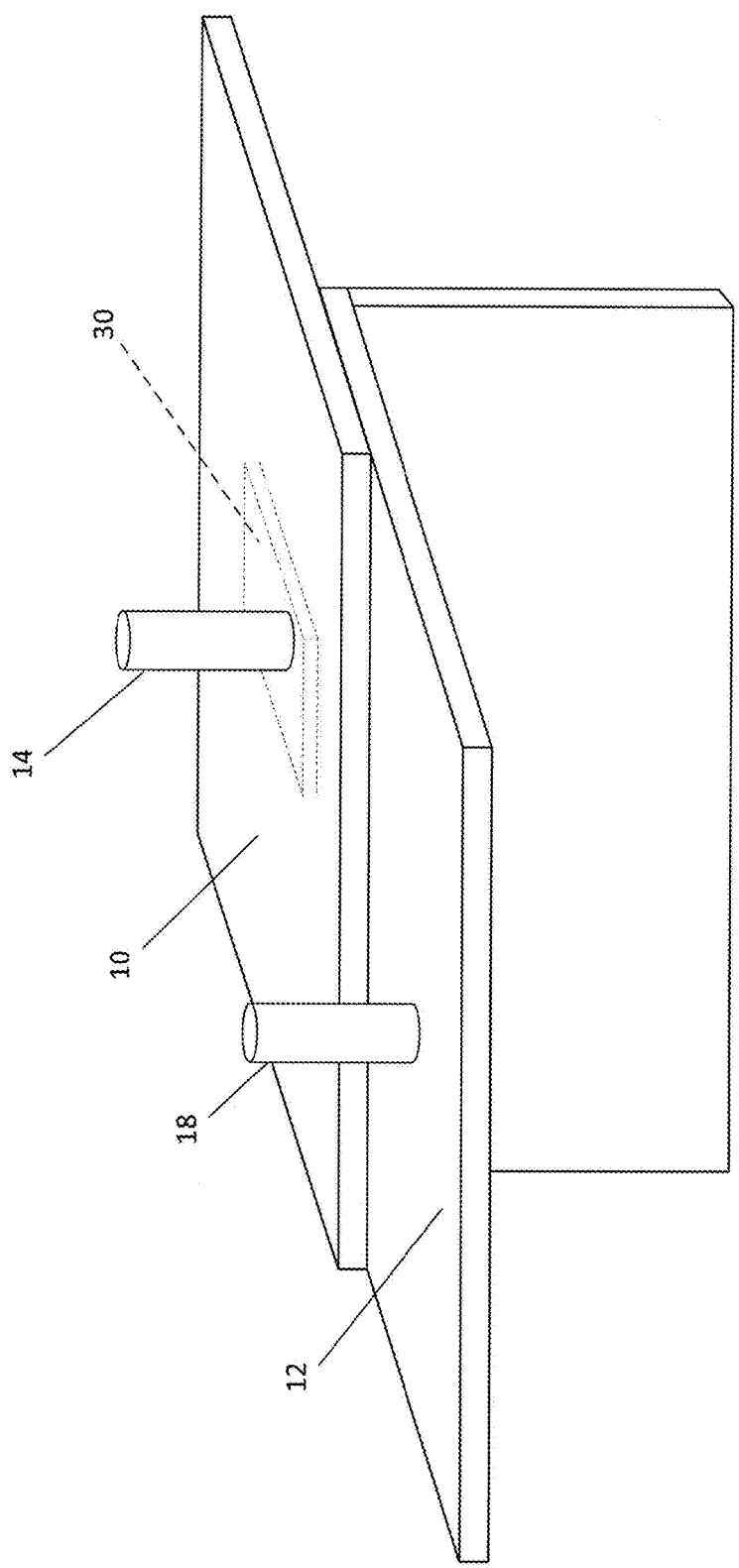
FIG. 7 is a right, front perspective view depicting the workpieces of FIG. 1 with an insulating member positioned between the workpieces.

A threshold limit can be determined through a number of methods such as testing of workpieces. Similar to the determination of a welding schedule for combinations of specific workpieces, it will be understood that each combination of workpieces can result in a threshold limit developed and implemented for those specific workpieces. In one example, as illustrated in FIG. 7, an electrical insulating member 30 can be positioned between the first workpiece 10 and the second workpiece 12 and below the first electrode 14. The electrical insulating member 30 can be positioned such that it forms a localized gap between the first and second workpieces 10, 12 and below the first electrode 14. Once the insulting member 30 is positioned, a low amperage electrical current can be applied to the first electrode 14. The resistance between the first 14 and second 18 electrodes can be measured and recorded. Such a measured resistance will be indicative of a localized gap below the first electrode 14. Further testing can be conducted by varying the thickness or size of the electrical insulating member 30, and additional resistance measurements can be recorded. Testing can also be conducted with no electrical insulating member 30. In such testing, the workpieces 10, 12 can be arranged so as to ensure that no gap is present between the workpieces 10, 12 under or proximate to the first electrode 14 (as illustrated in FIG. 1. The resistance measurements gathered through testing with varying thicknesses or size of insulating members 30 and without an insulating member 30 can be compared and analyzed and a threshold limit can be established.

In another example, a threshold limit can be established for advanced high strength steel utilizing the following method. In one example, workpieces are formed from sheets of advanced high strength steel, and electrical insulating members varying in thicknesses from 1 millimeter to 3 millimeters are prepared. Each insulating member can be individually placed between the workpieces to form gaps of varying thickness. For each of the varying gap thicknesses, an electrical current (e.g., of approximately 1 to 2 kA) can be applied to the weld electrode, and a resistance measurement is recorded. Such tests can be conducted numerous times for each thickness or size of insulating member. In addition, the workpieces can be tested a number of times with no electrical insulating members (i.e., no gap between the workpieces) with resistance measurements taken and recorded. In one example, each resistance measurement taken with an electrical insulating member positioned between the workpieces can be greater than 2500 micro-ohms. Each resistance measurement taken with no electrical insulating member positioned between the workpieces can range from about 650 micro-ohms to about 850 micro-ohms. Based on such results, a threshold limit can be established for determining whether workpieces fabricated from advanced high strength steel include a gap between the workpieces proximate to the weld electrode. The same or similar test conditions can be applied to determine a threshold for electrode face cleanliness. Depending on variables such as desired confidence level, criticality of weld, cost, desired efficiency, and the like, the threshold can be determined to be 850 micro-ohms, 2500 micro-ohms, or a resistance in between.

In another example of a method for determining a threshold limit for resistance welding of workpieces, a number of test workpieces are fabricated. Each set of test workpieces is positioned to be joined through resistance welding. A low amperage electrical current is applied to the weld electrode, and the resistance between the weld electrode and the ground electrode is measured and recorded. The workpieces are then joined through a resistance welding process. Each of the welded workpieces can be visually inspected, mechanically tested, and/or electrically tested to determine the quality of the weld. The measured resistances and the results of inspection and/or testing can be compared and analyzed. Based on such analysis, a threshold limit can be established for the resistance welding of the workpieces.

As described herein, once a threshold limit is determined, resistance measurements can be used to determine if a gap is present between two workpieces. Additional methods can then be used to reduce or eliminate the gap. One method of reducing or eliminating a gap is to apply a physical force F (shown in FIGS. 1 and 2) to the workpieces that forces the workpieces together. Another method of reducing or eliminating a gap is to apply localized heat to the material surrounding the gap such that the material thermally defects or relaxes, thus bringing the workpieces together. Application of localized heat can also be used to reduce other high resistance conditions, e.g., such as reducing resistance between an electrode and a workpiece resulting from lack of electrode surface cleanliness. One method of thermally deflecting or relaxing a portion of the workpiece proximate to the gap is to apply a relatively low amperage electrical current to the material through a weld electrode. As the electrical current passes through the material proximate to the gap, the electrical current heats the material so that the material begins to deflect. Such deflection can result in the reducing or closing of the gap. Yet another method of reducing or eliminating a gap is to apply a combination of heat and physical force to the material surrounding the gap. The application of heat can cause thermal deflection and lower the yield point of the material so that the application of force more readily further encourages the material to deflect to reduce or eliminate the gap.

In one example, once it is determined that a gap is present between the workpieces, a current (e.g., of approximately 3 kA to 4 kA) can be applied to the weld electrode. The application of such an electrical current can be referred to as a thermal deflection schedule. As the electrical current is applied, the temperature of the material proximate to the gap rises. Once the temperature sufficiently rises to cause thermal deflection, the gap between the workpieces can be reduced or eliminated. Once the gap is sufficiently reduced or eliminated, the workpieces can be joined together through a resistance welding process. The weld electrode can further be arranged to apply a force on the workpiece to reduce or eliminate the gap in cooperation with the thermal deflection.

During the thermal deflection of the workpieces to reduce or eliminate the detected gap, additional methods can be used to monitor if and when the gap is eliminated or sufficiently reduced. One such method is to measure and monitor the resistance during the thermal deflection schedule. As electrical current is provided to the workpieces to thermally deflect the workpieces, resistance measurements can decrease as the gap decreases. A method can provide for continuing the thermal deflection schedule until the resistance drops below a threshold limit. Once the resistance falls below the threshold limit, the welding equipment can apply a welding schedule to join the workpieces. It will be appreciated that a similar procedure, involving a thermal deflection schedule, can be used to reduce other high resistance conditions, e.g., such as reducing resistance between an electrode and a workpiece resulting from lack of electrode surface cleanliness.

Figure 8:
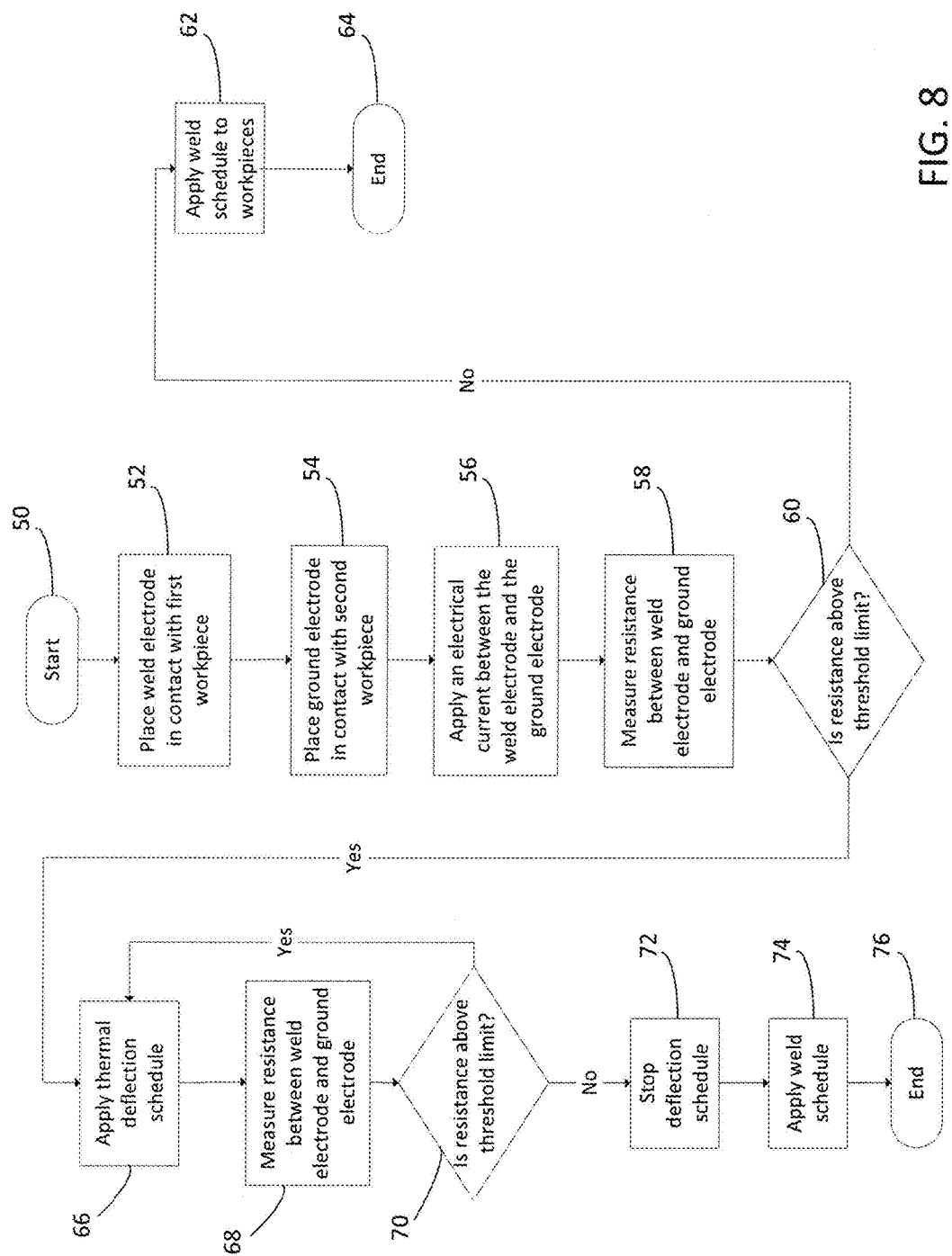
FIG. 8 is flowchart describing a method of single-sided welding according to one embodiment.

FIG. 8 is a flow chart illustrating an exemplary method for using a resistance welding process to join two workpieces. The method starts (block 50) by placing a weld electrode in contact with a first workpiece (block 52). A ground electrode is placed in contact with a second workpiece (block 54). An electrical current is applied between the weld electrode and the ground electrode (block 56). The resistance is measured between the weld electrode and the ground electrode (block 58). The measured resistance is compared to a threshold limit (block 60). If the measured resistance is below the threshold limit, a welding schedule is applied to the workpieces through the welding and ground electrodes (block 62) and the method ends (block 64). If the measured resistance is above the threshold limit, a thermal deflection schedule is applied to the workpieces (block 66) to thermally deflect the workpieces. The resistance is measured between the weld electrode and the ground electrode (block 68). The measured resistance is compared to a threshold limit (block 70). If the measured resistance is above the threshold limit, the thermal deflection schedule is continued (block 66). If the measured resistance is below the threshold limit, the thermal deflection schedule is stopped (block 72). The welding schedule is applied to the workpieces through the welding and ground electrodes (block 74) and the method ends (block 76).

Additional or alternative steps can be included in the method illustrated in FIG. 8. For example, the weld electrode can be arranged to apply a force to the first workpiece. The force can be applied when the weld electrode is first placed in contact with the first workpiece. In another example, the force can be applied by the weld electrode during the deflection schedule. In addition, the force applied by the weld electrode can be increased during the deflection schedule. For example, the force can be increased after the deflection schedule has been applied for a specific amount of time without the threshold resistance being reached.

FIGS. 9 and 10 are charts that illustrate a method of resistance welding two workpieces. FIG. 9 is a chart that plots the amount of electrical current applied to workpieces through the weld electrode over time. FIG. 10 is a chart that plots the value of resistance measurements captured over the same time period as FIG. 9. As shown in FIG. 10, the threshold limit 82 is about 1400 micro-ohms. As illustrated in FIG. 9, a sensing schedule 80 is applied to the workpieces. The sensing schedule 80 includes a relatively low electrical current of about 1 kA applied to the workpieces for about 1/60 of a second. As illustrated in FIG. 10, a peak resistance 84 measured and recorded during the sensing schedule is about 2550 micro-ohms. When compared to a threshold limit 82 of 1400 micro-ohms established for the workpieces, it can be determined that the measured resistance 84 during the sensing cycle 80 is greater than the threshold limit 82. Because the measured resistance 84 is greater than the threshold limit 82, a thermal deflection schedule 86 is applied to the workpieces. If the measured resistance 84 is below the threshold limit 82, the thermal deflection schedule 86 would not or might not be applied.

The thermal deflection schedule 86 is shown to include an electrical current of about 3 kA applied to the workpieces. During the thermal deflection schedule 86, the resistance 88 is measured and recorded. The duration of the thermal deflection schedule 86 is dependent upon the duration it takes for the measured resistance 88 to fall below the threshold limit 82. As illustrated in FIGS. 9 and 10, the thermal deflection schedule 86 is applied for four cycles before the resistance 88 falls below the threshold limit 82. Once the measured resistance 88 during the thermal deflection schedule 86 falls below the threshold limit 82, a welding schedule 90 can be applied to the workpieces. The welding schedule 90 includes application of a 4 kA electrical current for 3 cycles, application of a 7 kA electrical current for three cycles, and application of a 9 kA electrical current for 2 cycles. As described above, such a welding schedule can be arranged to join the workpieces together through a resistance welding process. The resistance 92 can continue to be measured and recorded during the welding schedule 90. Such measured resistance 92 can be monitored and analyzed to ensure that the welding schedule is progressing and to assure quality control over the welding process.

It will be understood that different welding schedules can be applied to the workpieces depending on whether a thermal deflection schedule was or was not applied or depending on the duration and amperage of any thermal deflection schedule applied to the workpieces. Also, it will be understood that a method of single-sided resistance welding can include delays between the sensing schedule, thermal deflection schedule, and welding schedule. For example, as shown in FIG. 9, a 6 cycle delay is included between the sensing schedule 80 and thermal deformation schedule 86. Additionally, a similar delay can be included between the thermal deflection schedule 86 and the welding schedule 90. Such delays can, for example, be included to accommodate feedback cycles for welding equipment. Such delays can also be included to allow time for heat generated by a previous schedule to dissipate before beginning the next schedule.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art. In addition, example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional blocks that are not illustrated.

What is claimed is:

1. A method of single-sided resistance welding comprising:
   providing a first workpiece;
   providing a second workpiece;
   positioning the first workpiece so that at least a portion of the first workpiece is in contact with at least a portion of the second workpiece;
   positioning a weld electrode in contact with the first workpiece;
   positioning a ground electrode in contact with the second workpiece;
   determining if a high resistance condition is present, said determining comprising:
     defining a resistance threshold limit;
     applying a first electrical current to the first workpiece and the second workpiece;
     measuring a magnitude of a resistance to the first electrical current; and
     comparing the magnitude of the resistance to the first electrical current to the resistance threshold limit to determine whether the magnitude of the resistance to the first electrical current is greater than or less than the resistance threshold limit;
   reducing the high resistance condition by selectively applying a second electrical current to the first workpiece and the second workpiece if the magnitude of the resistance to the first electrical current is greater than the resistance threshold limit; and
   joining the first workpiece and the second workpiece through welding,
   wherein defining the resistance threshold limit comprises:
     positioning an insulating member between the first workpiece and the second workpiece proximate to the weld electrode;
     applying the first electrical current to the first workpiece, through the insulating member, to the second workpiece;
     measuring a magnitude of a resistance of the insulating member, the first workpiece, and the second workpiece to the first electrical current with the insulating member positioned between the first workpiece and the second workpiece; and
     defining the resistance threshold limit at least in part based upon the magnitude of the resistance to the first electrical current with the insulating member positioned between the first workpiece and the second workpiece.

2. The method of claim 1, wherein the second electrical current is at least a portion of a thermal deflection schedule applied to the first workpiece and second workpiece; and
   when the high resistance condition comprises high resistance in at least one of the contact between the weld electrode and the first workpiece and the contact between the ground electrode and the second workpiece, said method further comprises applying the thermal deflection schedule to the first workpiece and the second workpiece to reduce the high resistance condition.

3. The method of claim 1, wherein the second electrical current is at least a portion of a thermal deflection schedule applied to the first workpiece and second workpiece; and
   when the high resistance condition comprises a gap present between the first workpiece and the second workpiece, said method further comprises applying the thermal deflection schedule to the first workpiece and second workpiece to thermally deflect at least one of the first workpiece and the second workpiece to reduce the gap until the gap is closed.

4. The method of claim 1, further comprising applying a force to the first workpiece with the weld electrode.

5. The method of claim 1, further comprising:
   periodically measuring a magnitude of a resistance to the second electrical current;
   comparing each periodically measured magnitude of the resistance to the second electrical current to the resistance threshold limit; and
   continuing the application of the second electrical current until one of the periodically measured magnitudes of the resistance to the second electrical current is less than the resistance threshold limit.

6. The method of claim 5, further comprising applying a third electrical current to the first workpiece and the second workpiece when one of the periodically measured magnitudes of the resistance to the second electrical current is less than the resistance threshold limit.

7. The method of claim 6, wherein the third electrical current is at least a portion of a welding schedule, said method further comprising applying the welding schedule to the first workpiece and the second workpiece to join the first workpiece and the second workpiece through welding.

8. The method of claim 7, further comprising:
measuring a magnitude of a resistance to the third electrical current; and
comparing the magnitude of the resistance to the third electrical current to the resistance threshold limit.

9. The method of claim 1, further comprising:
applying a fourth electrical current to the first workpiece and the second workpiece if the magnitude of the resistance is less than the resistance threshold limit.

10. The method of claim 9, wherein the fourth electrical current is at least a portion of a welding schedule, said method further comprising applying the welding schedule to the first workpiece and the second workpiece to join the first workpiece and the second workpiece through welding.

11. The method of claim 10, further comprising:
measuring a magnitude of a resistance to the fourth electrical current; and
comparing the magnitude of the resistance to the fourth electrical current to the resistance threshold limit.

12. The method of claim 1, wherein positioning an insulating member comprises positioning the insulating member having a first thickness of about 1 millimeter.

* * * * *